United States Patent Office 3,233,388
Patented Feb. 8, 1966

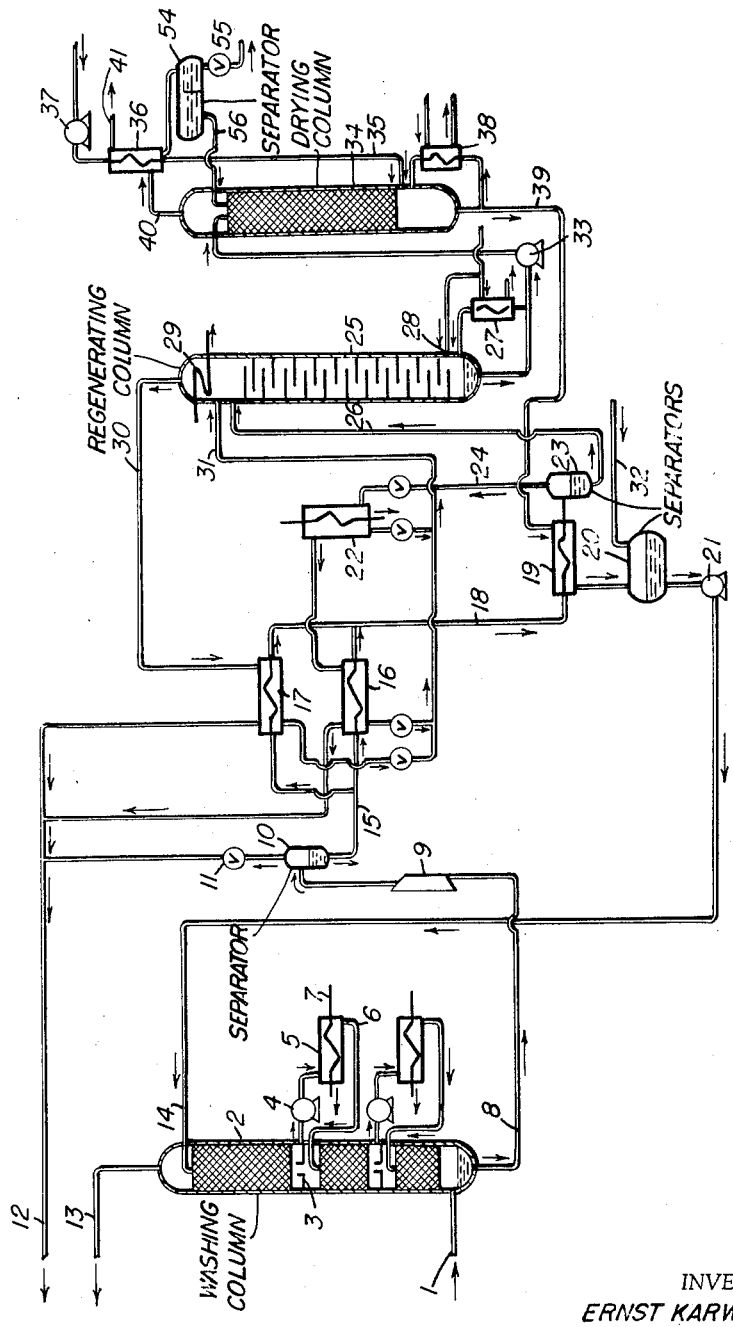

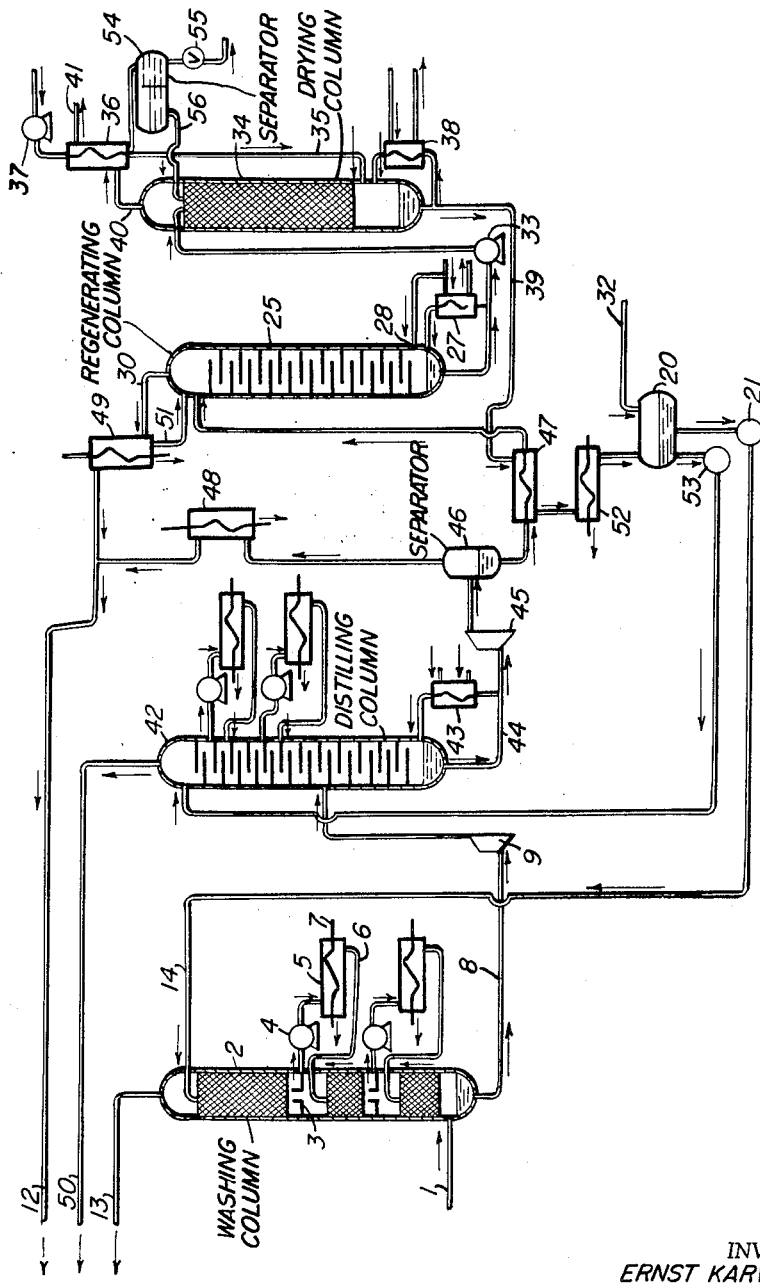

3,233,388
METHOD FOR REFINING DRY HYDROGEN SULPHIDE-CONTAINING GASEOUS HYDROCARBON MIXTURES
Ernst Karwat and August Erwin Kruis, Pullach, and Walter Scholz, Munich-Solln, Germany, assignors to Gesellschaft fur Linde's Eismaschinen Aktiengesellschaft, Hollriegelskreuth, near Munich, Germany
Filed Oct. 31, 1960, Ser. No. 66,286
Claims priority, application Germany, Nov. 7, 1959, G 28,320
6 Claims. (Cl. 55—44)

This invention relates to a process for removing and recovering hydrogen sulfide from dry, gaseous hydrocarbon mixtures having a high hydrogen sulfide content, which mixtures are under pressure. Such gas mixtures currently are obtained, in large amounts, in technical plants for the exploitation of natural gas sources. Such mixtures may contain up to 30% and more hydrogen sulfide, which is removed—with the exception of traces—before the gases are used and which are to be obtained in a concentration that can be used for further processing.

Many processes have been suggested for separating hydrogen sulfide from gases having a high hydrogen sulfide content, amongst which may be mentioned, for example, chemical and physical washing.

The present invention relates to the processing of dry gas mixtures with dry (i.e., non-aqueous) solvents. The reason for washing in the absence of water is that only with "water-free" washing can conventional steel be used for the construction of wash towers without the danger of corrosion. For this reason we have eliminated all those methods which use water-containing solvents from the following considerations.

Known, water-free physical washing methods use organic liquids, such as methanol, at low temperatures below 0° C. The hydrogen sulfide is removed from the wash liquor either by heating the solution to boiling temperature, or by stripping with solvent vapor or in low temperature washing at the washing temperatures by stripping with a cold auxiliary gas. In low-temperature washing the investment costs are high, so also are the operating costs because the energy consumption at low temperature must be covered.

This invention concerns a process for removing hydrogen sulfide from a dry hydrocarbon mixture, having a high hydrogen sulfide content, by physical washing at ambient—or, higher—temperatures with a dry solvent, with subsequent expansion of the loaded washing agent, which process is characterized in that the dissolved hydrogen sulfide is expelled from the dry solvent with the aid of steam and that the wet solvent is subsequently dried by bubbling a dry gas therethrough.

According to the invention the wash liquor loaded with hydrogen sulfide is regenerated by blowing in steam. This has the advantage that, if a high-boiling washing agent is used, the steam used as a stripping gas can be removed again by simple condensation on preferably water-cooled heat exchangers, and that the washing agent need not be heated close to its boiling point. Preferably, there is used a high-boiling solvent such, as for example, tetraline or an ethyl- or propyl-benzol isomer mixture and the like, whose vapor pressure at the washing temperature is lower than $10^{-2}$ kg./cm.², preferably $10^{-3}$ kg./cm.². The use of steam might at first seem absurd, because moisture is thus introduced into the washing agent, which is kept strictly water-free.

According to a second feature of the invention the solvent is subsequently purged with a dry auxiliary gas and thus dried, so that it can be fed again in dry form to the washing process. The auxiliary gas is preferably bubbled or blown through the solvent at the temperature of the regeneration, so that a maximum amount of water can be eliminated with a minimum of heat supply.

The blowing preferably is effected with dry inert gases such as nitrogen, carbon dioxide and the like. If these gases are not available, dry air can also be used for this purpose. It is also possible to use for this purpose a part of the gaseous hydrocarbon mixture already freed from hydrogen sulfide. Where air or a free oxygen-containing gas is used, temperature must be so selected that the composition of the mixture of air and solvent vapor remains under the explosion limit. This is another reason for the preferred use of high-boiling solvents. The explosion limit of air-solvent mixtures can be ascertained from one of the known technical or scientific tabular works.

The plants represented schematically and by way of example in FIG. 1 and FIG. 2 will further illustrate the process according to the invention. In the drawing, identical or corresponding parts are designated with the same reference numerals.

The object of the plants is to process dry natural gas of the following composition:

| | Percent by volume |
|---|---|
| $N_2$ | 8.0 |
| $CH_4$ | 60.0 |
| $CO_2$ | 15.0 |
| $H_2S$ | 17.0 |
| | 100.0 |

In FIG. 1, about 25,000 Nm.³/h. (i.e., cubic meters, measured at normal temperature and pressure, per hour) crude gas (of the above composition) are conducted through a pipe 1 into a washing column 2 at a temperature of about 30° C. and at a pressure of about 60 atmospheres absolute. In this column the gas is washed with about 62 t./h. water-free tetraline and thereby freed from hydrogen sulfide, with the exception of a residual content of 20 p.p.m. or less. The purified natural gas, which contains at most 0.002% hydrogen sulfide, leaves the plant through a conduit 13. The wash tower is subdivided several times by intermediate plates 3, on which the wash liquor collects and is conducted by means of a circulation pump 4 through a heat exchanger 5 in which the resulting heat of solution is transferred to cooling water flowing through a pipe 7. The cooled solution is fed through a pipe 6 to the next lower part of the wash column. The washing agent, loaded with hydrogen sulfide, leaves the wash column through a pipe 8, and it is subsequently expanded in an expansion machine 9, the major part of the dissolved hydrogen sulfide thereby being gassed out, and is then conducted to a separator 10, in which the hydrogen sulfide gas is separated and is discharged, after expansion through an expansion valve 11, through a collecting discharge pipe 12.

The wash liquor leaves the separator 10 through a pipe 15 and splits into two currents which pass through heat exchangers 16 and 17 where they are indirectly heated by hydrogen sulfide arriving from a heat exchanger 22 and from a regenerating column 25 respectively. Additional hydrogen sulfide thereby gasses out. After the combination of the two partial currents in a conduit 18, they are conducted through the latter and through a heat exchanger 19, in which the current is further heated by washing agent arriving from a regenerating column, and into a separator 23 from which hydrogen sulfide can be withdrawn again through a pipe 24.

The hydrogen sulfide withdrawn here is first cooled with water in a heat exchanger 22, with vapors of the washing agent carried along being separated, and is subsequently conducted, after further cooling in a heat exchanger 16, into the aforesaid collecting discharge pipe 12. Wash liquor is again withdrawn from the bottom part of separator 23 and is conducted through a pipe 26 into a regenerating column 25 which operates, for example, at a pressure of about 1.4 atmospheres absolute and whose sump is heated by a steam-heated circulation heater 27 to about 100° C. A condenser 29, in the head of the column, is cooled with water. For expelling the remaining hydrogen sulfide, about 50 kg./h. steam are fed into column 25 at 28. From the head of regenerating column 25 there are withdrawn, through a pipe 30, about 5650 Nm.$^3$/h. gas having a content of about 75% $H_2S$, balance $CH_4$ and $CO_2$. Water vapor and tetraline vapor carried along by the gas are, to a great extent, separated in the cooler 17, and fed again to the regenerating column 25 through a pipe 31.

The regenerated washing agent leaves the sump of regenerating column 25 practically free of hydrogen sulfide, but wet, and is conducted by means of a pump 33 to the head of a drying column 34 which contains fillers, like Raschig rings, to increase the effective surface. At 35 a drying gas is introduced into this column, which drying gas was sucked in by a pump 37 and heated in a heat exchanger 36. A steam-heated circulation heater 38 keeps the washing agent in the drying column at a temperature of the regenerating column. The dried washing agent is withdrawn from the foot of column 34 and conducted through the pipe 39 to the heat exchanger 19, in which it is cooled to ambient temperature by the loaded washing agent and subsequently is conducted to the collecting tank 20, from whence it is returned by the pump 21 through the pipe 14 to the head of the washing column 2. Losses of washing agent can be replaced through a pipe 32.

The hot, steam-laden drying gas issues through a pipe 40 from the drying column 34 and is cooled in heat exchanger 36 wherein vapors of the water and washing agent that have been carried along are condensed. Both constituents are separated from each other in a separator 54 and the wet washing agent is discharged through a pipe 56 into the drying column 34, whilst the water is discharged through the valved conduit 55 to the outside.

FIG. 2 diagrammatically shows a plant in which an inert gas-distilling column 42 is arranged between the washing column 2 and the regenerating column 25. In this column 42 the gases $CO_2$, $CH_4$ and $N_2$, washed out along with hydrogen sulfide from the natural gas, are expelled practically completely and free from hydrogen sulfide.

The dry natural gas is washed in the above described manner in the washing column 2. Through a pipe 8 the hydrogen sulfide-laden washing agent is withdrawn from the foot of column 2 and is work-producingly expanded in a turbine 9 into distilling column 42, in which a pressure of about 20 atmospheres absolute is maintained. The major part of the nitrogen and methane, dissolved along with the hydrogen sulfide, as well as a part of the dissolved carbon dioxide, are gassed out by pressure relief. The balance of the nitrogen and methane, as well as the major part of the carbon dioxide, is then expelled in the bottom part of the distilling column 42 by heating by means of a steam-heated circulation heater 43, and the dissolved hydrogen sulfide is thus concentrated. From the ascending gas mixture the hydrogen sulfide is washed out by the descending washing agent to a concentration of 0.002%. As in the washing tower 2, the heat of solution is here also given off in cooling stages to the cooling water. A pipe 50 withdraws the inert gases from the head of column 42. The wash liquor, withdrawn from the foot of the distilling column through the pipe 44, contains practically only the hydrogen sulfide washed out from the natural gas. It is expanded in the turbine 45 in a work-producing manner to about 3 atmospheres absolute. About 80% of the dissolved hydrogen sulfide thereby is gassed out, and is cooled in condenser 48 to ambient temperature and let off through the pipe 12, together with the hydrogen sulfide arriving from the regenerating column 25. The washing liquor, separated in separator 46, is heated in a heat exchanger 47 and is charged into the regenerating column 25. Hydrogen sulfide issues from the head of this column and is, in a water cooler 49, freed from carried along water and washing agent vapors which return through the pipe 51 into the column. The other parts of the plant have already been described, with the exception of a water cooler 52 and a circulation pump 53 which feeds the washing agent from the storage tank 20 to the head of the column 42.

We claim:

1. A cyclical process for recovering $H_2S$ from a compressed natural gas containing $H_2S$ in high concentration together with a major amount of methane, comprising the steps of eliminating moisture from a moisture-laden organic solvent of the group consisting of tetralin, ethylbenzene and propylbenzene by contacting said solvent with dry gas;

compressing the resulting dry organic solvent;

scrubbing the compressed natural gas with the compressed dry solvent in a scrubbing zone;

removing purified natural gas; withdrawing the organic solvent saturated with $H_2S$ and with methane;

reducing the pressure thereof in a separate zone to a pressure sufficient to flash off the methane;

warming the organic solvent solution rich in $H_2S$ in indirect countercurrent heat exchange with lean dried organic solvent;

stripping the organic solvent rich in $H_2S$ by direct contact with steam to expel the $H_2S$ thereby obtaining a mixture of $H_2S$ and steam and a moisture-laden organic solvent;

recovering the $H_2S$ from said mixture by condensing the steam;

and re-cycling the mositure-laden organic solvent to the drying step in a repetition of the cycle.

2. A cyclical process for recovering $H_2S$ from a compressed natural gas containing $H_2S$ in high concentration together with a major amount of methane, comprising the steps of eliminating moisture from wet tetralin solvent by contacting said solvent with dry gas;

compressing the dry tetralin solvent;

scrubbing the compressed natural gas with the compressed dried tetralin solvent in a scrubbing zone;

removing purified natural gas; withdrawing the tetralin solvent saturated with $H_2S$ and with methane;

reducing the pressure thereof in a separate zone to a pressure sufficient to flash off the methane;

heating the tetralin solution rich in $H_2S$ in indirect counter-current heat exchange with lean dried tetralin solvent;

stripping the tetralin solvent rich in $H_2S$ by direct contact with steam to expel the $H_2S$ thereby obtaining a mixture of $H_2S$ and steam and a wet tetralin solvent;

recovering the $H_2S$ from said mixture by condensing the steam;

and re-cycling the wet tetralin solvent to the drying step in a repetition of the cycle.

3. A cyclical process for recovering $H_2S$ from a compressed natural gas containing $H_2S$ in high concentration together with a major amount of methane, comprising the steps of eliminating moisture from wet ethylbenzene solvent by contacting said solvent with dry gas;

compressing the dry ethylbenzene solvent;

scrubbing the compressed natural gas with the compressed dried ethylbenzene solvent in a scrubbing zone;

removing purified natural gas; withdrawing the ethylbenzene solvent saturated with $H_2S$ and with methane;

reducing the pressure thereof in a separate zone to a pressure sufficient to flash off the methane;

heating the ethylbenzene solution rich in $H_2S$ in indirect counter-current heat exchange with lean dried ethylbenzene solvent;

stripping the ethylbenzene solvent rich in $H_2S$ by direct contact with steam to expel the $H_2S$ thereby obtaining a mixture of $H_2S$ and steam and a wet ethylbenzene solvent;

recovering the $H_2S$ from said mixture by condensing the steam;

and re-cycling the wet ethylbenzene solvent to the drying step in a repetition of the cycle.

4. Process for recovering $H_2S$ from a compressed natural gas containing $H_2S$ in high concentration together with a major amount of methane, comprising the steps of eliminating moisture from wet propylbenzene-solvent by contacting said solvent with dry gas;

compressing the dry propylbenzene-solvent;

scrubbing the compressed natural gas with the compressed dried propylbenzene-solvent in a scrubbing zone;

removing purified natural gas; withdrawing the propylbenzene-solvent saturated with $H_2S$ and with methane;

reducing the pressure thereof in a separate zone to a pressure sufficient to flash off the methane;

heating the propylbenzene-solution rich in $H_2S$ in indirect counter-current heat exchange with lean dried propylbenzene solvent;

stripping the propylbenzene-solvent rich in $H_2S$ by direct contact with steam to expel the $H_2S$ thereby obtaining a wet propylbenzene-solvent and a mixture of $H_2S$ and steam;

recovering the $H_2S$ from said mixture by condensing the steam;

and re-cycling the wet propylbenzene-solvent to the drying step as described above.

5. A cyclical process for recovering $H_2S$ from a compressed natural gas containing $H_2S$ in high concentration together with a major amount of methane, comprising the steps of eliminating moisture from a moisture-laden organic solvent of the group consisting of tetralin, ethylbenzene and propylbenzene by contacting said solvent with dry gas;

compressing the resulting dry organic solvent;

scrubbing the compressed natural gas with the compressed dry solvent, in a scrubbing zone, to produce a first organic wash liquid saturated with $H_2S$ and methane and a purified natural gas substantially free from $H_2S$;

withdrawing the resulting purified natural gas;

withdrawing the saturated organic wash liquid;

partially reducing the pressure of the saturated wash liquid in a separate zone to a pressure sufficient to flash off part of the $H_2S$ and methane; heating the wash liquid to flash off a gaseous mixture composed of a further part of $H_2S$ and methane;

washing the flashed off gaseous mixture with fresh dry organic solvent to separate out methane substantially free from $H_2S$ and preferentially dissolving the $H_2S$ in the dry organic solvent thereby forming a second wash liquid;

combining said first and second wash liquids;

further reducing the pressure of the combined wash liquid to release $H_2S$, and yield to a depleted wash liquid;

separating released $H_2S$ from the depleted wash liquid;

warming the depleted wash liquid in indirect counter-current heat exchange with lean dried organic solvent;

stripping the warmed depleted wash liquid by direct contact with steam to expel the $H_2S$ thereby obtaining a mixture of $H_2S$ and steam and a moisture-laden organic solvent;

cooling said mixture to separate gaseous $H_2S$ from a condensate composed of moisture-laden organic solvent; and re-cycling the moisture-laden solvent to the drying step in a repetition of the cycle.

6. A cyclical process for recovering $H_2S$ from a compressed carbon dioxide-containing natural gas containing $H_2S$ in high concentration together with a major amount of methane, comprising the steps of eliminating moisture from a moisture-laden organic solvent of the group consisting of tetralin, ethylbenzene and propylbenzene by contacting said solvent with dry gas;

compressing the resulting dry organic solvent;

scrubbing the compressed natural gas with the compressed dry organic solvent, in a scrubbing zone, to produce a first organic wash liquid saturated with $H_2S$ and methane and containing carbon dioxide, and a purified natural gas substantially free from $H_2S$;

withdrawing the resulting purified natural gas;

withdrawing the first saturated organic wash liquid;

partially reducing the pressure of the saturated wash liquid in a separate zone to a pressure sufficient to flash off part of the $H_2S$ and $CO_2$ and methane;

heating the wash liquid to flash off a gaseous mixture composed of a further part of $H_2S$, $CO_2$ and methane;

washing the flash off gaseous mixture with fresh dry organic solvent to separate out carbon dioxide and methane substantially free from $H_2S$ and preferentially dissolving the $H_2S$ in the dry organic solvent thereby forming a second wash liquid;

combining said first and second wash liquids;

further reducing the pressure of the combined wash liquid to release $H_2S$, and yield a depleted wash liquid;

separating released $H_2S$ from the depleted wash liquid;

warming the depleted wash liquid in indirect counter-current heat exchange with lean dried organic solvent;

stripping the warmed depleted wash liquid by direct contact with steam to expel the $H_2S$ thereby obtaining a mixture of $H_2S$ and steam and a moisture-laden organic solvent;

cooling said mixture to separate gaseous $H_2S$ from a condensate composed of moisture-laden organic solvent; and re-cycling the moisture-laden solvent to the drying step in a repetition of the cycle.

References Cited by the Examiner
UNITED STATES PATENTS

| | | | |
|---|---|---|---|
| 2,428,643 | 10/1947 | Young | 55—32 |
| 2,614,904 | 10/1952 | Royer | 23—2 |
| 2,732,414 | 1/1956 | Stoops. | |
| 2,863,527 | 12/1958 | Herbert et al. | 55—73 |
| 2,891,633 | 6/1959 | Morre et al. | 55—65 XR |
| 2,926,752 | 3/1960 | Redemann et al. | 55—68 |
| 2,926,753 | 3/1960 | Kohl et al. | 55—68 |
| 3,074,245 | 1/1963 | Becker | 62—17 XR |

REUBEN FRIEDMAN, *Primary Examiner.*

HERBERT L. MARTIN, WALTER BERLOWITZ,
*Examiners.*